July 31, 1934.  C. L. TRAPP  1,968,624
GRAIN DUMP
Filed June 8, 1931   2 Sheets-Sheet 1
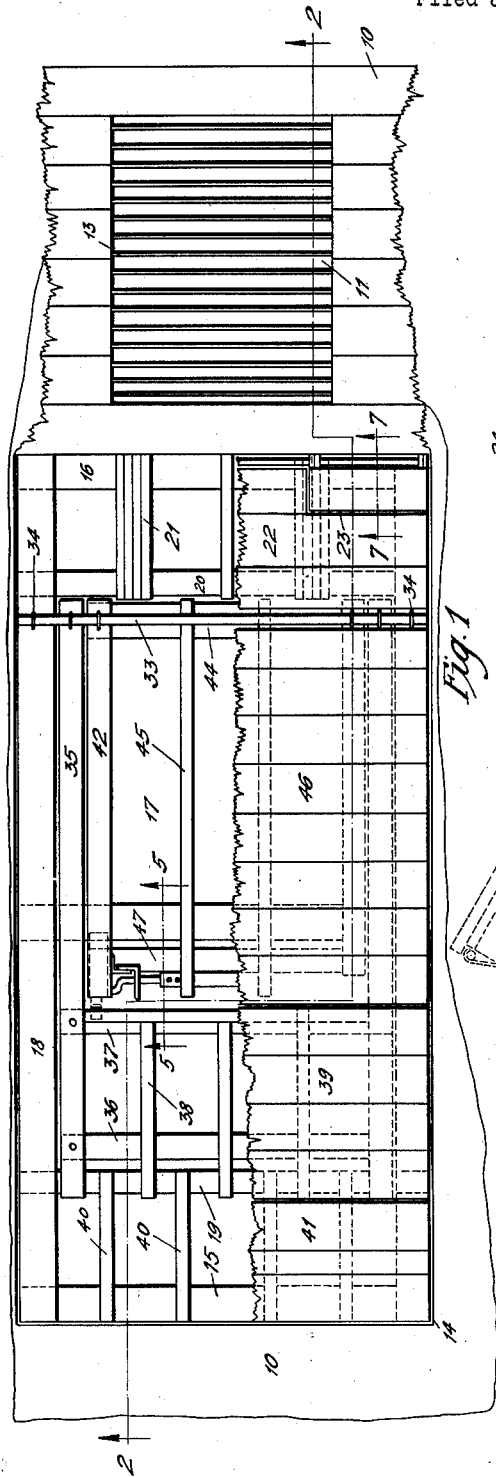
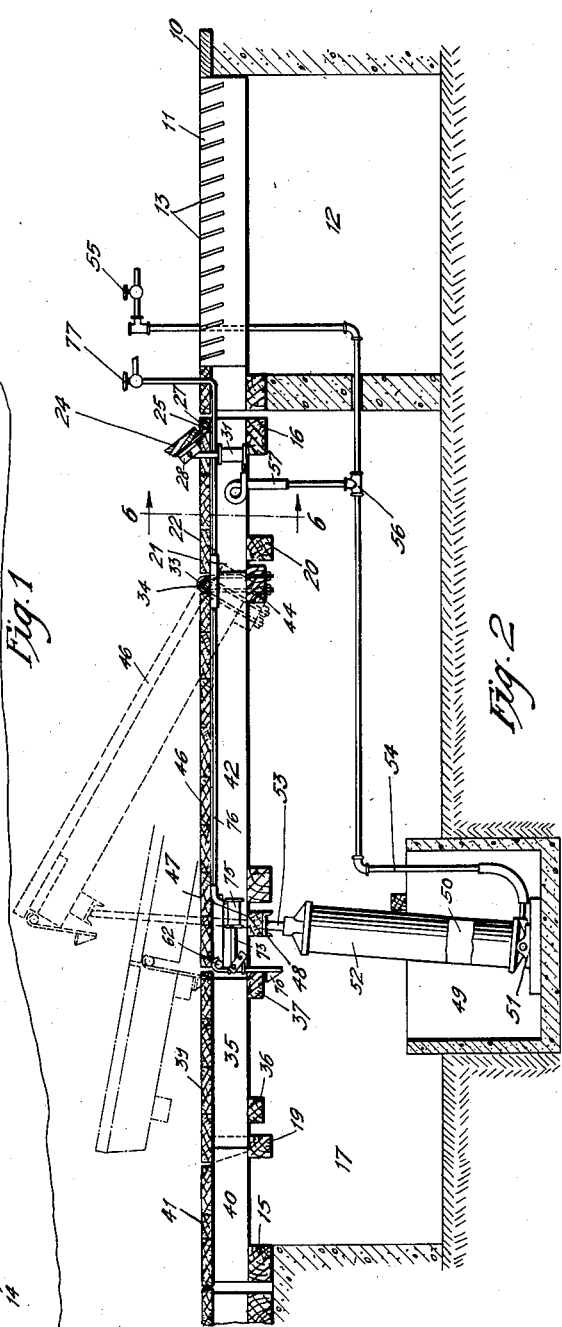
Inventor
Charles L. Trapp.
by Orwig & Hague Attys.

July 31, 1934.  C. L. TRAPP  1,968,624
GRAIN DUMP
Filed June 8, 1931   2 Sheets-Sheet 2

Inventor
Charles L. Trapp.
by Orwig & Hague Attys.

Patented July 31, 1934

1,968,624

UNITED STATES PATENT OFFICE 1,968,624

GRAIN DUMP

Charles L. Trapp, Des Moines, Iowa, assignor to Globe Machinery & Supply Company, Des Moines, Iowa, a corporation of Iowa Application June 8, 1931, Serial No. 542,967

3 Claims. (Cl. 214—49)

The object of my invention is to provide a grain dump of simple, durable and inexpensive construction; and particularly to provide in that type of a grain dump, having a main dumping platform to be used in connection with comparatively short trucks or wagons and an auxiliary platform to be used in connection therewith for accommodating extra long wagons or trucks, improved means for detachably connecting the auxiliary platform to the main platform, whereby a single operating device may be utilized to operate both platforms in unison.

A further object is to provide in a grain dump of that type having a tilting platform an improved stop device to prevent the truck or automobile from moving rearwardly as the forward end of the wagon or truck is elevated.

A further object is to provide in a grain dump, employing two pivoted platforms and means for detachably connecting one of the platforms to the other and a movable stop device, improved means for automatically operating the stop device slightly ahead of the elevation of the movable platform; and further to provide pneumatic means for elevating the platform, the latching mechanism and the stop device.

A further object is to provide in a grain dump employing a tiltable platform and a movable stop block pneumatic means for first operating the stop block and then for elevating the platform.

A further object is to provide in a grain dump an improved latching device for operatively connecting the auxiliary platform to the main platform.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of my improved dumping device.

Figure 2 is a longitudinal sectional view of the same.

Figure 3:
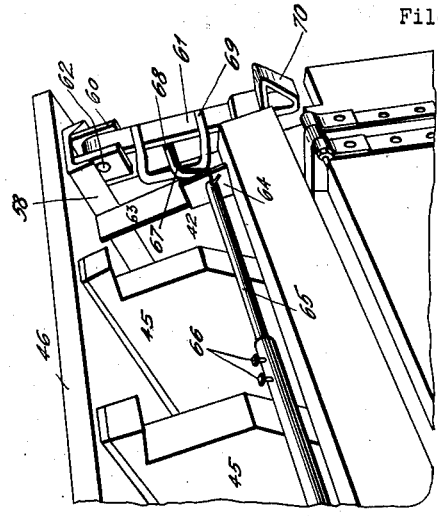
Figure 3 is a perspective view of one corner of the front end of the main platform illustrated in a partially elevated position, showing one of the latch devices.

Referring to the accompanying drawings, I have used the reference numeral 10 to indicate the floor of a grain elevator or similar building, in which my improved dumping platform is installed.

The floor 10 is provided with an opening 11 in the top of the grain pit 12, said opening having a series of slats 13. The floor 10 also has an opening 14 for receiving my improved device, which comprises transversely arranged beams 15 and 16 carried by a suitable wall or other structure 17. Said beams 15 and 16 are designed to support longitudinally extending beams 18 forming side members of the frame for carrying the dump platforms hereinafter described.

Other transversely arranged beams 19 and 20 are provided, the member 20 being placed ahead of the member 16 a slight distance. A series of longitudinally arranged joists 21 is carried by the beams 16 and 20, on which a floor section 22 is laid. In each corner of the back end of the floor 22 is provided a notch 23 formed by cutting the back board 22 shorter than the others. Supported in the notch 23 is what I shall term a stop block 24, said block being pivotally connected to a shaft 25 by means of suitable straps 26. Said shaft is supported by suitable brackets 27 carried by the members 21.

Supported on the under surface of each of the blocks 24 is an angle plate 28 for pivotally receiving a piston rod 29 operated from a piston 30 within a cylinder 31, in such a manner that as the piston 30 is moved outwardly, the free edge of the block 24 will be elevated to the position illustrated in Figure 2.

A chain 32 is provided for limiting the upward movement of the block, and to prevent it from being swung rearwardly when engaged by vehicle wheels. The cylinder 31 is designed to rest on the beam 16. The floor portion 22 ahead of the blocks 24 is designed to support the rear wheels of the vehicle being dumped.

Supported on the beams 18 at a point in front of the front edge of the floor 22 is a shaft 33, which is secured in position by means of suitable bolts or staples 34. Pivotally mounted on the shaft 33 is a pair of longitudinally extending beams 35 supported adjacent to the inner surfaces of the beams 18, having their forward ends connected by a cross beam 36. The forward ends of the beams 35 rest on the cross beam 19.

Supported back of the beam 36 is a beam 37 having its ends secured to the beams 35. Longitudinally extending joists 38 are carried by the beams 36 and 37 and designed to support a floor section 39 of a width equal to the width of the opening 14, and having its ends overlapping the beams 18.

Supported on the beams 15 and 19 is a series of joists 40 designed to carry a floor section 41. By this arrangement it will be seen that the floor section 39 provides a platform, the free end of which is pivoted to swing about the shaft 33 as a pivot center.

Pivoted to the shaft 33 is a second pair of beams 42 having their forward ends connected by a beam 47, said beam being supported against the under surface of the beams 42. Supported under the rear ends of the beams 42 is a cross beam 44. Said beams 47 and 44 support sills 45 on which the platform 46 is supported. Said beam 47 is reinforced by a channel iron 48, the flanges of which project downwardly.

A pit 49 is formed in the ground beneath the forward end of the platform 46 in which an air cylinder 50 is mounted, the lower end of which is pivotally connected to a bracket 51. Said cylinder is provided with a piston 52 to which a piston rod 53 is connected, the upper end of the rod 53 resting in the channel formed by the flanges 48. An air pipe 54 connects with the lower end of the cylinder 50, said pipe including a control valve 55 and a T 56. A flexible pipe 57, such as a rubber hose, connects the T 56 with the cylinder 31, thus providing means for supplying air to said cylinder.

The cylinder 31 and its piston is of such diameter that when air is admitted to the pipe 54, a comparatively small pressure will cause the stop block 24 to be elevated to the position illustrated in Figure 2, and limited against further movement by means of the chain 32, thus assuring that the block will be elevated before the forward end of the platform 46.

Further admission of air to the cylinder 51 will cause the rod 53 to be elevated and with it the beam 47, which in turn will elevate the forward end of the platform 46 to the dotted line position shown in Figure 2 without elevating the platform 39.

The means for operatively connecting the platform 39 to the platform 46 will now be described. Said means comprises channel sections 58 secured to the under surface of the forward end of the platform 46. The rear end of each of the channels 58 have downwardly projecting blocks 60 between which a hook bar 61 has its upper end pivotally mounted by means of a pivot 62. To each of the channels 58 a downwardly extending angle 63 is connected. The lower end of said angle has a forwardly extending plate 64. The forward ends of the plates 64 are designed to rotatively support a crank shaft 65, which is preferably formed of two parts, one telescopically supported in the other, so that the crank may be fitted to meet the working conditions of the platforms of slightly different widths. The shaft members are connected by set screws 66.

Each end of the shaft 65 terminates in a crank 67 having a crank pin 68 designed to rest back of the central portion of the members 61. A substantially U-shaped rod 69 is welded to the member 61 to form a keeper in which the crank pin 68 travels.

It will readily be seen that rotation of the crank shaft through an angle of substantially 90° will cause the lower ends of the bars 61 to be moved forwardly and rearwardly, and to cause hook members 70 secured thereto to be brought into or out of engagement with the lower edge of the beam 37. The said hook is placed in a latching position when the crank members 67 are moved to a substantially horizontal position or to a position perpendicular to the bars 61, so that the cranks are substantially slightly below dead center. Thus means is provided whereby the hook portions 70 are positively locked to the members 37 when in said horizontal position.

Figure 5:
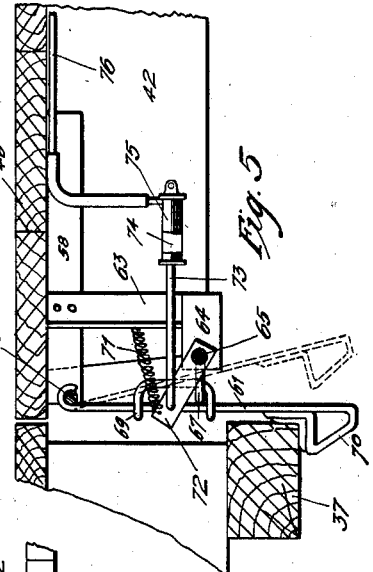
Figure 5 is an enlarged, detail, sectional view taken on the line 5—5 of Figure 1.
Figure 4:
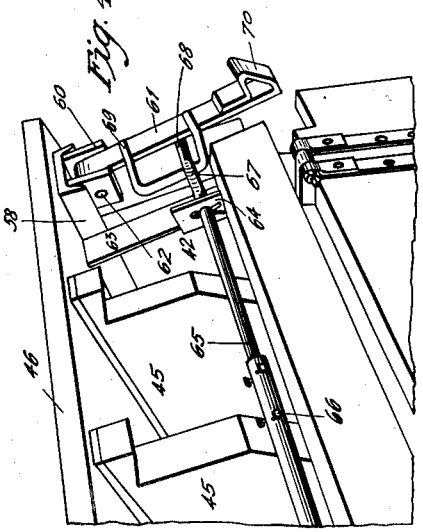
Figure 4 is a similar view to Figure 3 showing the latching device in its operative position.
Figure 6:
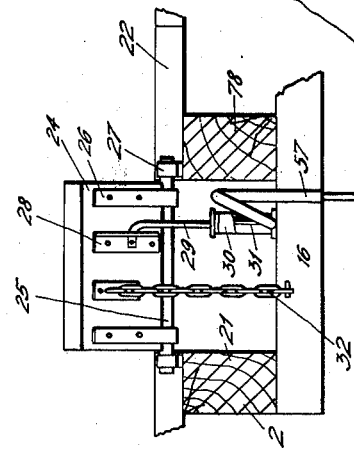
Figure 6 is a detail sectional view taken on the line 6—6 of Figure 2.
Figure 7:
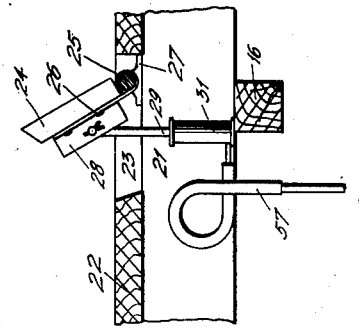
Figure 7 is a detail sectional view taken on the line 7—7 of Figure 1.

Rotation of the crank shaft 65 in a clockwise direction as illustrated in Figure 5 will cause the crank pin to move upwardly in its keeper, causing the bar 61 to be moved to the dotted line position shown in Figure 5. A spring 71 is provided for normally retaining the hooks 70 in their inoperative positions. One of the springs 71 is connected to one of the angles 63 and its opposite end to the outer end of an arm 72 secured to the shaft 65.

Pivotally connected to the arm 72 is a connecting rod 73 designed to be operated by an air cylinder 75 of ordinary construction. Said cylinder 75 has an air pipe 76 and a control valve 77. Both of the valves 55 and 77 are connected to a suitable air supply.

By this arrangement it will be seen that when it is desired to operate both the platforms 39 and 46 in unison, then the air valve 77 is operated, permitting air to pass to the cylinder 75, causing the rod 73 to be moved forwardly, which in turn will rotate the shaft 65 in a counterclockwise direction, forcing the member 70 to position beneath the beam 37. Air may then be admitted to the pipe 36, causing the stop block 24 to be elevated and thence the platform 46, which will carry with it the platform 39. Said platform 39 is designed to support the front wheels of a comparatively long truck. The platform 46 is comparatively short to accommodate the ordinary farm wagon which is drawn by draft animals.

It will be seen from the foregoing description that the rear end of the platforms 39 and 46 are pivoted about the shaft 33 at the rear end of the platform 46, so that none of the platform projects downwardly into the pit as heretofore has been the practice. The rear wheels of the vehicle rest on the platform 23, thus providing greater clearance between the rear end of the vehicle and the floor, which is particularly desirable with trucks having bodies extending a comparatively long distance back of the rear axles, and provides clearance for mechanism or beam structure beneath the rear end of the truck body.

Thus I have provided a dump in which the contents of either ordinary farm wagons or comparatively large trucks may be dumped into a suitable pit beneath the floor, and in which is employed a positive latching means for the auxiliary platform, and means for positively operating the stop block before the platforms are elevated, and in connection therewith improved pneumatic means for operating the platforms, the latching device and the stop block.

I claim as my invention:

1. In a device of the class described, the combination of a floor having a dump opening, a tiltable platform supported in said floor, a stop block pivotally supported in said floor, fluid operated means for tilting said platform, fluid operated means for elevating one edge of said stop block, means for conveying fluid under pressure to both of said fluid operated means, the stop block operating means being designed to operate under lower pressure than the platform operating means whereby the stop block will operate automatically ahead of the platform.

2. In a device of the class described, the combination of a floor having a dump opening, a tiltable platform supported in said floor, a stop block pivotally supported in said floor, fluid operated means for tilting said platform, fluid operated means for elevating one edge of said stop block, means for conveying fluid under pressure to both of said fluid operated means, the stop block operating means being designed to operate under lower pressure than the platform operating means whereby the stop block will operate automatically ahead of the platform, and means for limiting the movement of said stop block.

3. In a device of the class described, the combination of a floor having a dump opening, a tiltable platform supported in said floor, a movable stop block, fluid operated means for tilting said platform, fluid operated means for actuating said stop block, and means for conveying fluid under pressure to both of said fluid operated means, the stop block operated means being designed to operate under lower pressure than the platform operating means whereby the stop block will be operated automatically ahead of the platform.

CHARLES L. TRAPP.